US012712139B2

(12) United States Patent
Mitsui

(10) Patent No.: US 12,712,139 B2
(45) Date of Patent: Aug. 18, 2026

(54) KEYBOARD DEVICE AND ELECTRONIC APPARATUS

(71) Applicant: Lenovo (Singapore) Pte. Ltd., Singapore (SG)

(72) Inventor: Riku Mitsui, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 19/183,397

(22) Filed: Apr. 18, 2025

(65) Prior Publication Data

US 2026/0162917 A1 Jun. 11, 2026

(30) Foreign Application Priority Data

May 15, 2024 (JP) ................................ 2024-079721

(51) Int. Cl.
*H01H 13/704* (2006.01)
*F21V 8/00* (2006.01)

(52) U.S. Cl.
CPC ......... *H01H 13/704* (2013.01); *G02B 6/0055* (2013.01); *G02B 6/006* (2013.01)

(58) Field of Classification Search
CPC ..... H01H 13/704; G02B 6/0055; G02B 6/006
See application file for complete search history.

(56) References Cited

U.S. PATENT DOCUMENTS 7,841,791 B2 11/2010 Iso
8,530,768 B2 * 9/2013 Hwa ..................... H01H 13/83 362/616
9,070,520 B2 6/2015 Chen
10,871,602 B1 * 12/2020 Ho ....................... G02B 6/0076
11,144,131 B1 * 10/2021 Ho ......................... H01H 13/83
11,175,444 B1 * 11/2021 Pan ...................... G02B 6/0088
2013/0093606 A1 * 4/2013 Chen ...................... H01H 13/83 341/22
2014/0133182 A1 * 5/2014 Yao ........................ H01H 13/83 427/523
2017/0011870 A1 * 1/2017 Liang .................. H01H 13/704
2024/0112870 A1 * 4/2024 Chen .................... G02B 6/0055

FOREIGN PATENT DOCUMENTS

JP 2010267203 A 11/2010
JP 2017157393 A 9/2017
JP 6868716 B1 5/2021
JP 2023007157 A 1/2023

* cited by examiner

*Primary Examiner* — Bryon T Gyllstrom
(74) *Attorney, Agent, or Firm* — Osha Bergman Watanabe & Burton LLP

(57) ABSTRACT

A keyboard device includes a light source and a plurality of keycaps that is capable of emitting light with light emitted from the light source. The keyboard device includes a base plate configured to support the keycaps on a top surface side and a membrane sheet that has a top contact sheet, a bottom contact sheet, and a spacer sheet interposed between the top contact sheet and the bottom contact sheet, and that is laminated on a top surface of the base plate, in which the top contact sheet, the bottom contact sheet, and the spacer sheet have light transmittance, a light reflecting layer is provided on a top surface of the top contact sheet, and the membrane sheet has a part of at least one sheet of the top contact sheet, the bottom contact sheet, and the spacer sheet disposed below the keycaps.

17 Claims, 9 Drawing Sheets

12C
24
24a
24b
31
33
35
34
30
36
37
L
34b
35b
52B
48a
48
50
32A
39
58
34a
42
35a
33a
33b
34c
30a
30b
56
TOP
BOTTOM
FRONT
REAR

KEYBOARD DEVICE AND ELECTRONIC APPARATUS

CROSS-REFERENCE TO RELATED APPLICATIONS

This application claims priority to Japanese Patent Application No. 2024-079721 filed on May 15, 2024, the contents of which are hereby incorporated herein by reference in their entirety.

BACKGROUND OF THE INVENTION

Field of the Invention

The present invention relates to a keyboard device and an electronic apparatus including the keyboard device.

Description of the Related Art

An electronic apparatus such as a laptop PC may be equipped with a keyboard device capable of causing a keycap to emit light (for example, refer to Japanese Patent No. 6868716).

SUMMARY OF THE INVENTION

The keyboard device as described above often employs a configuration in which a membrane sheet having a three-layer structure, a base plate that supports a keycap, and a backlight module are laminated in this order from above. The backlight module includes a light source in the vicinity of the center of the left and right sides of the keyboard device. The light from the light source is guided to the left and right sides by a light guide plate, and each keycap is caused to emit light through through-holes formed in the base plate and the membrane sheet.

Incidentally, in general, each layer of the membrane sheet is formed of a transparent PET film. A light emission experiment is performed in a dark room on such a keyboard device. As a result, light leakage into the membrane sheet from the through-hole under the keycap is confirmed, it is found that a factor in decreasing the amount of light emitted to the keycap.

Embodiments of the present disclosure provide a keyboard device that is capable of suppressing a decrease in the amount of light, and an electronic apparatus including the keyboard device.

A keyboard device according to one or more embodiments includes a light source, a plurality of keycaps that is capable of emitting light with light emitted from the light source, a base plate configured to support the keycap on a top surface side, and a membrane sheet that has a top contact sheet, a bottom contact sheet, and a spacer sheet interposed between the top contact sheet and the bottom contact sheet, and that is laminated on a top surface of the base plate, in which the top contact sheet, the bottom contact sheet, and the spacer sheet have light transmittance, a light reflecting layer is provided on a top surface of the top contact sheet, and the membrane sheet has a part of at least one sheet of the top contact sheet, the bottom contact sheet, and the spacer sheet disposed below the keycap, and a light diffusion pattern on a surface of the part disposed below the keycap.

An electronic apparatus according to one or more embodiments includes a chassis and a keyboard device including a light source and a plurality of keycaps that is capable of emitting light with light emitted from the light source and facing a top surface of the chassis, in which the keyboard device includes a base plate configured to support the keycap on a top surface side, and a membrane sheet that has a top contact sheet, a bottom contact sheet, and a spacer sheet interposed between the top contact sheet and the bottom contact sheet, and that is laminated on a top surface of the base plate, the top contact sheet, the bottom contact sheet, and the spacer sheet have light transmittance, a light reflecting layer is provided on a top surface of the top contact sheet, and the membrane sheet has a part of at least one sheet of the top contact sheet, the bottom contact sheet, and the spacer sheet disposed below the keycap, and a light diffusion pattern on a surface of the part disposed below the keycap.

Embodiments of the present disclosure can suppress a decrease in the amount of light.

DETAILED DESCRIPTION OF THE INVENTION

A keyboard device and an electronic apparatus including the keyboard device according to one or more embodiments will be described in detail below with example embodiments with reference to the accompanying drawings.

Figure 1:
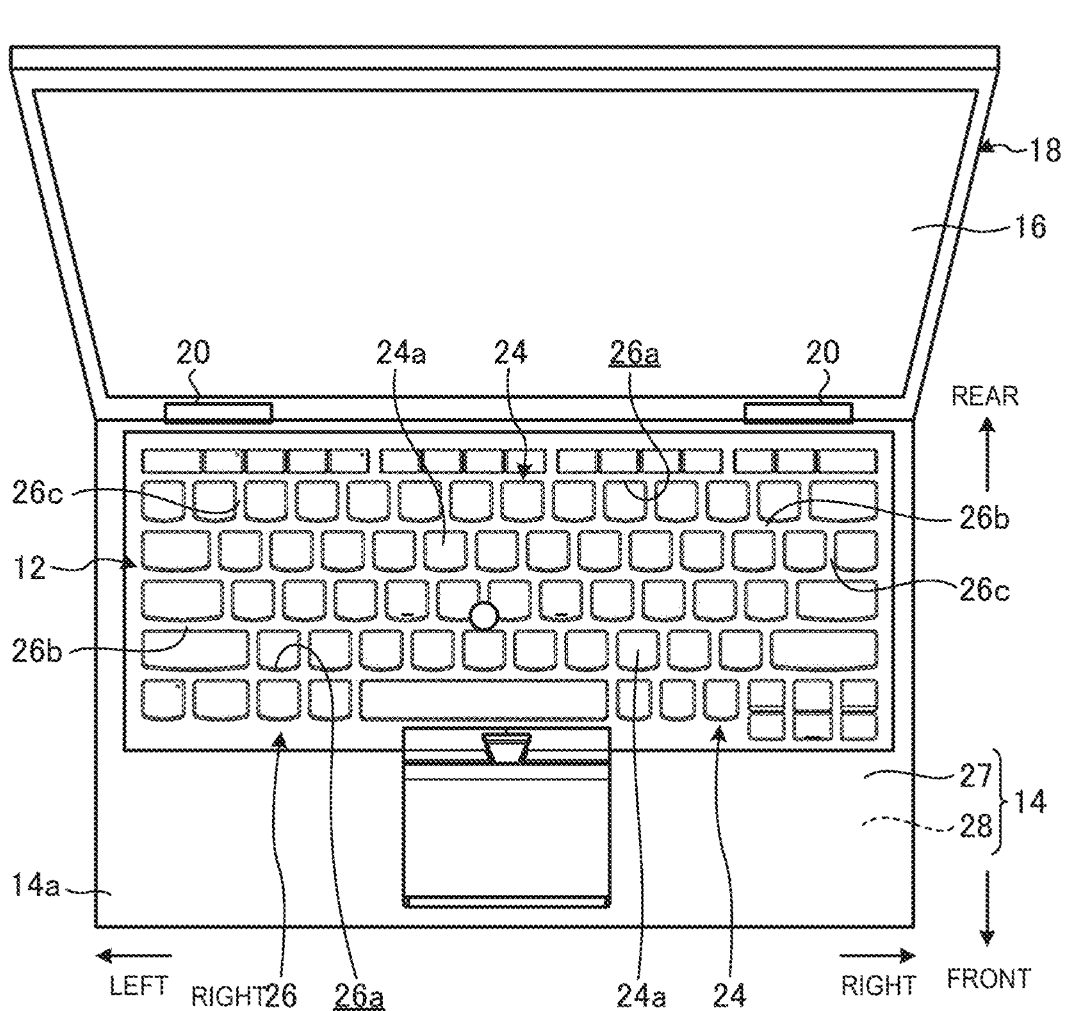
FIG. 1 is a plan view of an electronic apparatus according to one or more embodiments.

FIG. 1 is a plan view of an electronic apparatus 10 according to one or more embodiments.

As illustrated in FIG. 1, the electronic apparatus 10 includes a chassis 14 on which a keyboard device 12 is mounted, and a display chassis 18 on which a display 16 is mounted. In one or more embodiments, the electronic apparatus 10 that is a clamshell-type laptop PC in which the chassis 14 and the display chassis 18 are connected to each other to be relatively rotatable via a hinge 20 will be described as an example. FIG. 1 illustrates a usage form in which the display chassis 18 is opened from the chassis 14.

The electronic apparatus 10 is not limited to the clamshell type as long as it is an electronic apparatus equipped with a keyboard device.

Hereinafter, each element such as the chassis 14 and the keyboard device 12 mounted thereon will be described by using a direction viewed from a user who uses the keyboard device 12 while looking at the display 16 as a reference, in which a front side is referred to as a front, a rear side is referred to as a rear, a thickness direction is referred to as top and bottom, and a width direction is referred to as left and right.

The display chassis 18 is a flat box that is thinner than the chassis 14, and has the display 16 on a front surface. The display 16 is made of, for example, an organic EL or a liquid crystal. A bottom end portion of the display chassis 18 is connected to a rear end portion of the chassis 14 via the hinge 20.

The chassis 14 is a thin flat box, and the keyboard device 12 faces a top surface 14*a*. A motherboard on which a CPU, a memory, and the like are mounted, a speaker device, a cooling device, a battery device, and the like are accommodated inside the chassis 14.

The keyboard device 12 is supported on an upper portion of the chassis 14. The keyboard device 12 has a plurality of key switches 24. The keyboard device 12 is an isolation type keyboard device in which the periphery of a keycap 24*a* that serves as an operation surface of each key switch 24 is partitioned by a frame 26.

The frame 26 is a net-shaped frame body formed of a resin, a metal, or the like. The chassis 14 includes a cover member 27 that forms the top surface 14*a* and four peripheral surfaces, and a cover member 28 that closes a bottom surface opening of the cover member 27. The frame 26 is integrally molded with the cover member 27 forming the top surface 14*a*. The frame 26 may be configured separately from the cover member 27. The frame 26 has a plurality of key holes 26*a* into which each keycap 24*a* is vertically movable and inserted. In the frame 26, a portion surrounded by a horizontal frame portion 26*b* extending in a left-right direction and a vertical frame portion 26*c* extending in a front-rear direction serves as the key hole 26*a*.

Next, a specific configuration example of the keyboard device 12 will be described.

In the following, the keyboard device 12 will be described in the order of a keyboard device 12A (refer to FIG. 2), a keyboard device 12B (refer to FIG. 5), and a keyboard device 12C (refer to FIG. 6).

Figure 2:
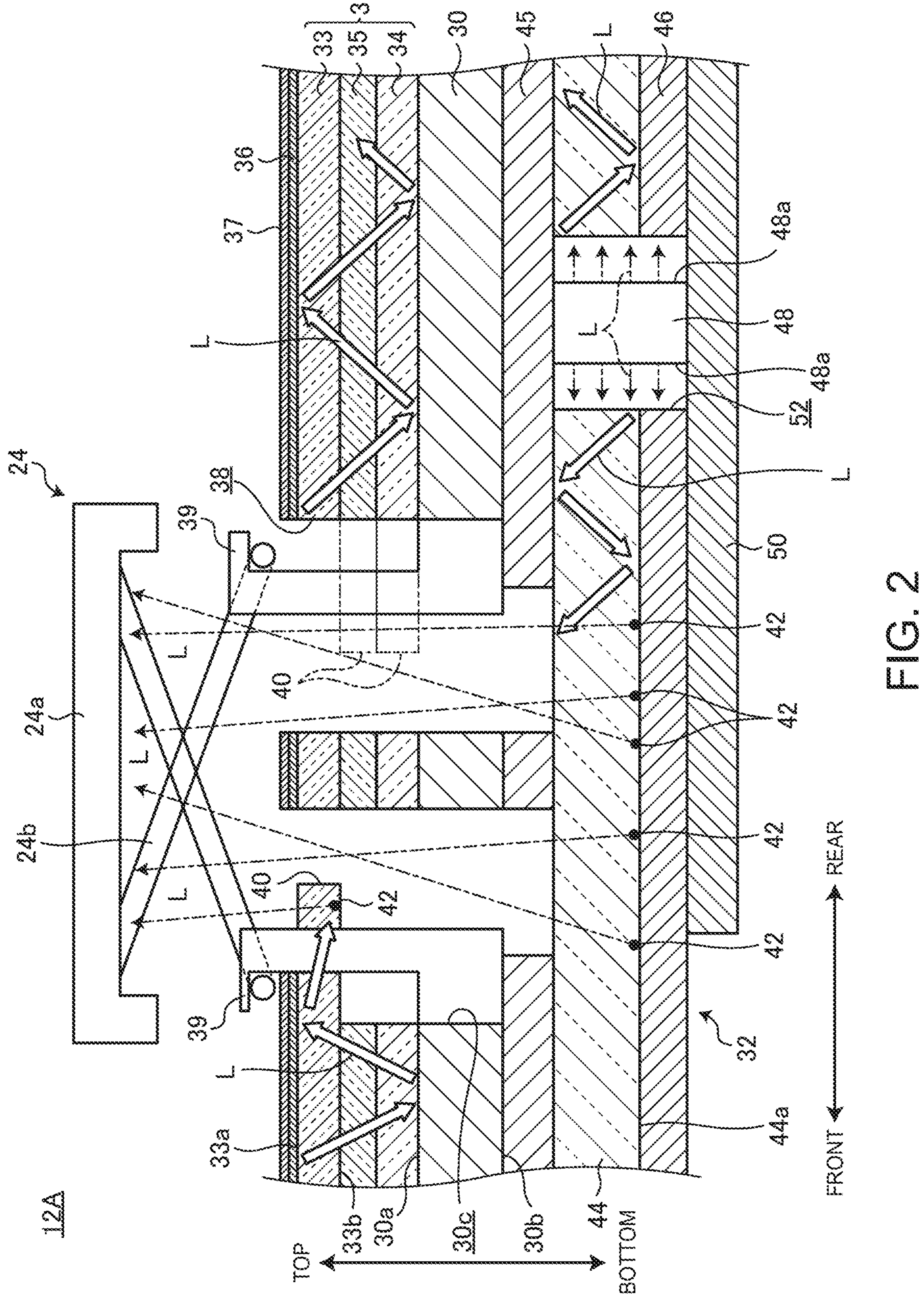
FIG. 2 is a schematic side cross-sectional view of a keycap and a peripheral portion thereof in a keyboard device according to one or more embodiments.
Figure 3:
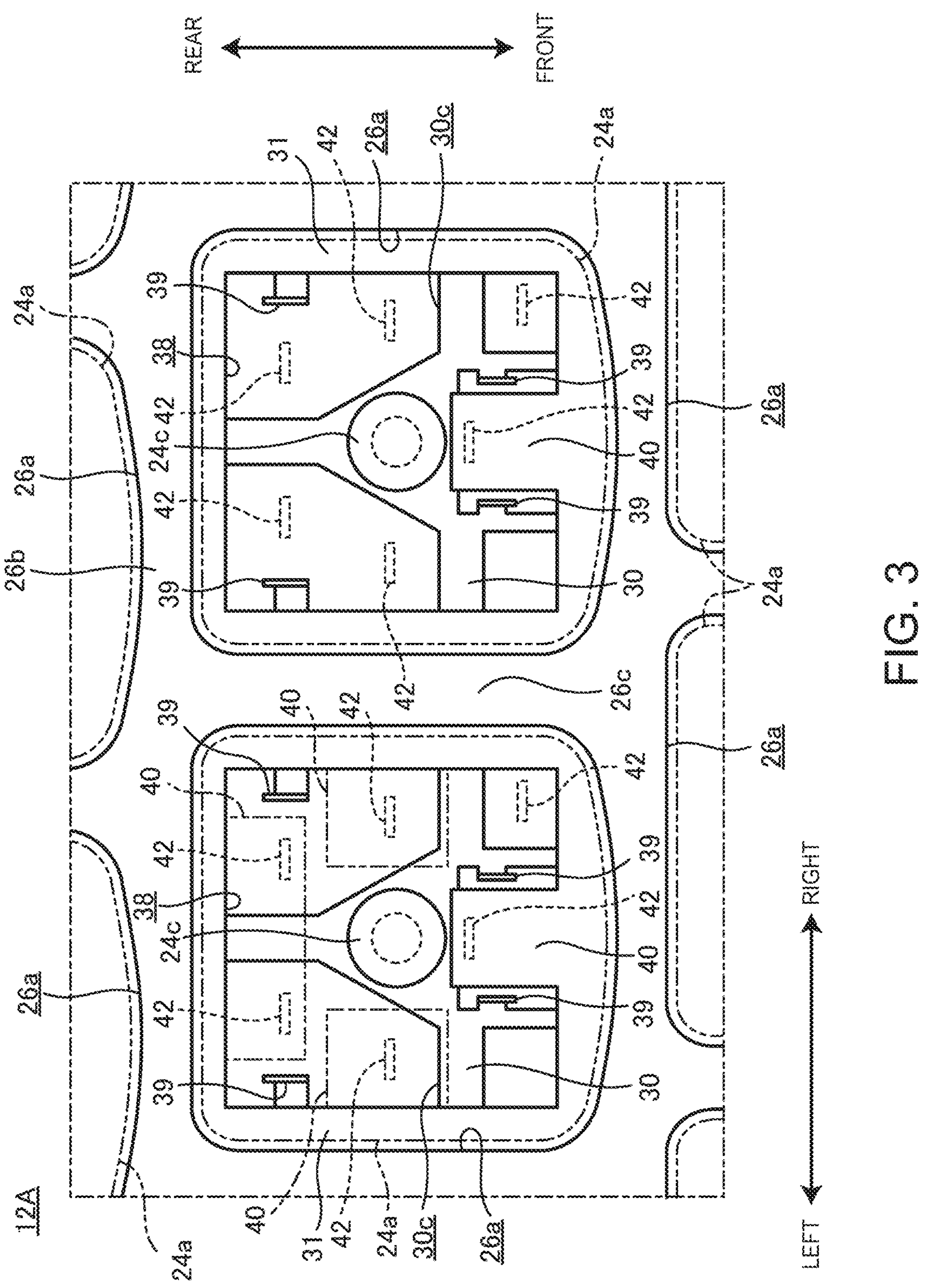
FIG. 3 is a schematic plan view of the keycaps and the peripheral portion thereof illustrated in FIG. 2, in accordance with one or more embodiments.
Figure 4:
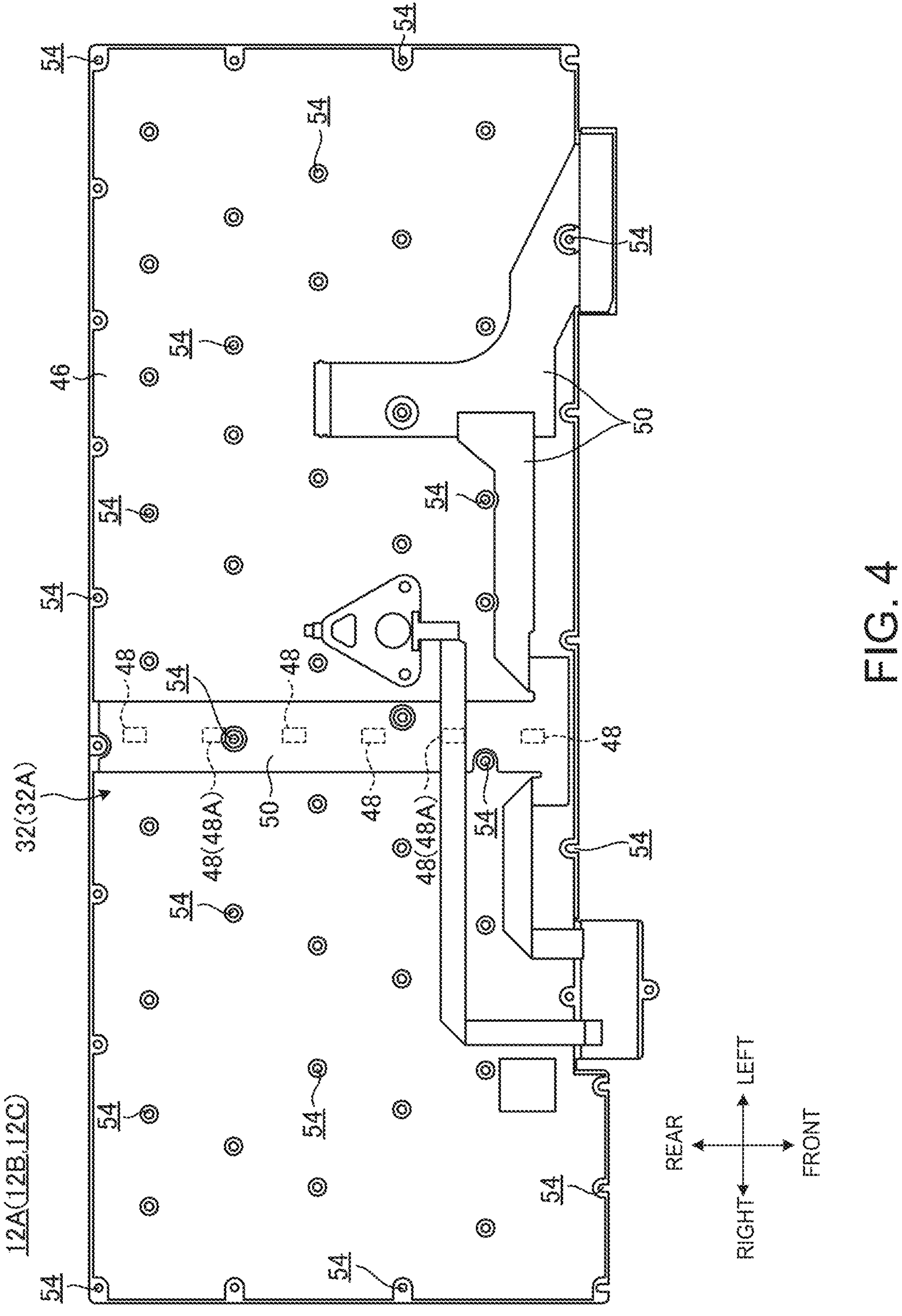
FIG. 4 is a bottom view of the keyboard device illustrated in FIG. 3, in accordance with one or more embodiments.

FIG. 2 is a schematic side cross-sectional view of the keycap 24*a* and the peripheral portion thereof in the keyboard device 12A. In FIG. 2, the frame 26 is not illustrated, and the same applies to FIGS. 5 and 6. FIG. 3 is a schematic plan view of the keycaps 24*a* and the peripheral portion thereof illustrated in FIG. 2. In FIG. 3, only the outline of the outer shape of the keycap 24*a* is illustrated by a two-dot chain line, and the same applies to FIG. 7. FIG. 4 is a bottom view of the keyboard device 12A illustrated in FIG. 3.

As illustrated in FIGS. 2 and 3, the keyboard device 12A includes the plurality of key switches 24, a base plate 30, a membrane sheet 31, and a light emitting module 32.

Each key switch 24 includes the keycap 24*a* and a guide mechanism 24*b*. The guide mechanism 24*b* is a scissor mechanism that supports the keycap 24*a* to be vertically movable on a top surface 30*a* side of the base plate 30. A rubber dome 24*c* stands in the center of the guide mechanism 24*b* (refer to FIG. 3). The rubber dome 24*c* is a dome-shaped member formed of a flexible elastic material, such as silicone rubber. The rubber dome 24*c* presses the membrane sheet 31 in a case where the keycap 24*a* is pressed down, and returns the keycap 24*a* to an original position in a case where the pressing operation of the keycap 24*a* is released.

The base plate 30 is a thin plate on which each key switch 24 and the frame 26 are supported. The base plate 30 extends over substantially the entire outer shape of the keyboard device 12A. As the base plate 30, a metal plate-shaped member, such as a thin stainless steel plate or aluminum plate, obtained by performing cutout forming or punching forming can be used.

The membrane sheet 31 is a switch sheet with a three-layer structure in which the contacts close in a case where the membrane sheet 31 is pressed. The membrane sheet 31 extends to a position that overlaps below all the key switches 24. The membrane sheet 31 is laminated on the top surface 30*a* of the base plate 30. The membrane sheet 31 includes a top contact sheet 33, a bottom contact sheet 34, and a spacer sheet 35 interposed between the contact sheets 33 and 34.

The contact sheets 33 and 34 each have a predetermined conductive pattern on opposite surfaces facing each other with a space formed by the spacer sheet 35 interposed therebetween. The contact sheets 33 and 34 can be configured, for example, such that a conductive ink such as silver paste or carbon paste is printed on a surface of the transparent PET film. The contact sheets 33 and 34 are formed of the transparent PET film, and thus have light transmittance in a surface normal direction and a thickness direction orthogonal to the surface normal direction. As long as the contact sheets 33 and 34 have light transmittance, the contact sheets 33 and 34 may be formed of a material other than the transparent PET film. Thicknesses of the contact sheets 33 and 34 are formed to be extremely thin, for example, about 0.07 mm, and have high flexibility.

The spacer sheet 35 insulates the contact sheets 33 and 34. The spacer sheet 35 can be formed of, for example, the transparent PET film like the contact sheets 33 and 34, and has light transmittance. As long as the spacer sheet 35 has light transmittance, the spacer sheet 35 may also be formed of a material other than the transparent PET film. A thickness of the spacer sheet 35 can be formed to be, for example, about 0.06 mm.

In the membrane sheet 31, a light reflecting layer 36 and a decorative layer 37 are laminated on the top surface 33*a* of the top contact sheet 33. The light reflecting layer 36 can be configured to cover the top surface 33*a* with, for example, a light reflective paint formed of white, silver, or the like. The light reflecting layer 36 is provided to efficiently guide light that has entered the membrane sheet 31 from the light emitting module 32 within the membrane sheet 31. In the membrane sheet 31, light from a light source 48 may be intentionally introduced as illustrated in configuration examples of FIGS. 5 and 6 described below. In the membrane sheet 31, light that is diffused and reflected by a light diffusion pattern 42 may be unintentionally introduced. In the membrane sheet 31, light that is diffused and reflected by the light diffusion pattern 42 and is further reflected by the keycap 24*a* or the guide mechanism 24*b* may be unintentionally introduced. The light reflecting layer 36 is also provided to prevent the light guided within the membrane sheet 31 from being absorbed by the black decorative layer 37. The decorative layer 37 is a surface layer for avoiding the membrane sheet 31 exposed from the gap between the keycap 24*a* and the frame 26 being conspicuous in appearance. The decorative layer 37 can be configured to cover a top surface of the light reflecting layer 36 with, for example, black paint.

In the membrane sheet 31, the top contact sheet 33 pressed down by the rubber dome 24*c* is elastically deformed in a case where the keycap 24*a* is pressed down. As a result, a conductive pattern (movable contact) on the top contact sheet 33 side comes into contact with a conductive pattern (fixed contact) on the bottom contact sheet 34 side to close the contact. Accordingly, the membrane sheet 31 outputs a predetermined input signal in accordance with a key type.

As illustrated in FIGS. 2 and 3, the membrane sheet 31 has a through-hole 38 directly below each keycap 24*a*. The through-hole 38 has, for example, a substantially rectangular shape in a plan view. The base plate 30 is disposed in a bridge shape inside the through-hole 38, and the membrane sheet 31 is also disposed on the top surface 30*a* of this portion on a floating island. The through-hole 38 can allow the light from the light emitting module 32 to pass through the keycap 24*a*. The through-hole 38 is also used for inserting a hook 39 that protrudes from the top surface 30*a* of the base plate 30. For example, four hooks 39 are provided at portions located below each key switch 24. Each hook 39 supports a shaft pin of the guide mechanism 24*b*. The base plate 30 has a through-hole 30*c*. The through-hole 30*c* communicates with the through-hole 38 and can allow light from the light emitting module 32 to pass through the through-hole 38.

In one or more embodiments, the membrane sheet 31 has an extending portion 40 in which a part of the top contact sheet 33 protrudes inside the through-hole 38.

The extending portion 40 is a small piece in which the transparent PET film forming the top contact sheet 33 protrudes into an inner peripheral space of the through-hole 38. The extending portion 40 is disposed below the keycap 24*a*. The light reflecting layer 36 and the decorative layer 37 are not provided on the top surface 33*a* of the extending portion 40. That is, the transparent PET film is exposed at the extending portion 40. As illustrated by a two-dot chain line in FIG. 2, the extending portion 40 can also be provided on the bottom contact sheet 34 and the spacer sheet 35. That is, the extending portion 40 can be provided on at least one sheet of the contact sheets 33 and 34 and the spacer sheet 35. The extending portion 40 can be formed to protrude, for example, from an inner wall of the front side of the through-hole 38 toward the rear side (refer to FIG. 4). As illustrated by a two-dot chain line in FIG. 4, the extending portion 40 can also be provided on the rear side of the through-hole 38 and the left and right inner walls.

Figure 7:
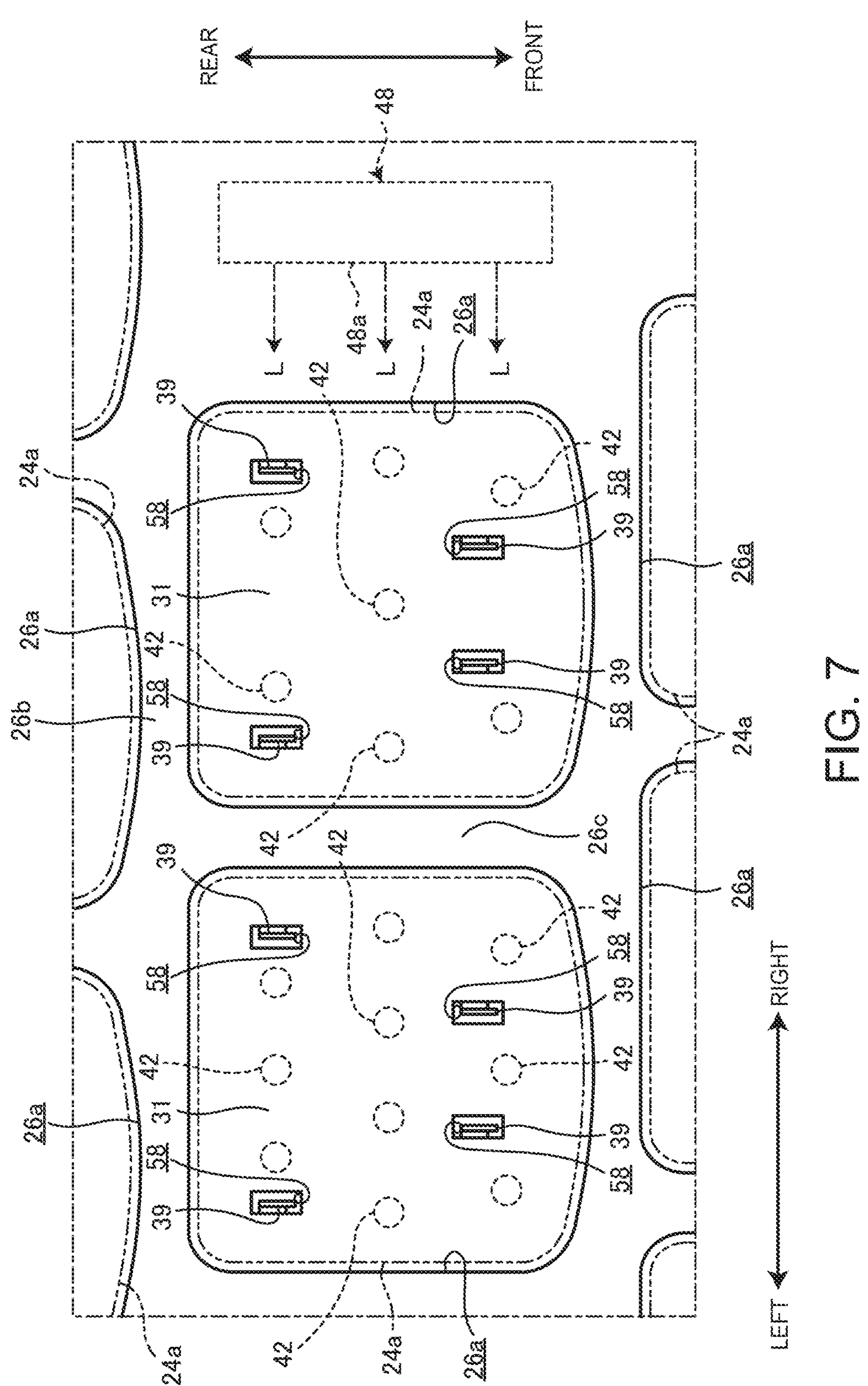
FIG. 7 is a schematic plan view of the keycaps and the peripheral portion thereof illustrated in FIG. 6, in accordance with one or more embodiments.

The light diffusion pattern 42 is provided on a surface of the extending portion 40. The light diffusion pattern 42 can be provided on the bottom surface 33*b* of the top contact sheet 33 forming the extending portion 40. The light diffusion pattern 42 can be provided on the top surface of the top contact sheet 33 forming the extending portion 40 or can be provided on both the top and bottom surfaces. The light diffusion pattern 42 is a convex or concave pattern formed on the surface of the top contact sheet 33. The light diffusion pattern 42 is a pattern for diffusing the light guided in the top contact sheet 33 by diffuse reflection and increasing the amount of light toward the keycap 24*a*. The light diffusion pattern 42 can be formed of, for example, a streaked slit pattern as illustrated in FIG. 3. The light diffusion pattern 42 can also be formed in a circular or rectangular dot pattern as illustrated in FIG. 7. Accordingly, the extending portion 40 can cause the keycap 24*a* to emit light using the light diffused by the light diffusion pattern 42.

The light emitting module 32 is a backlight module for emitting light from each keycap 24*a*. The light emitting module 32 is laminated on the bottom surface 30*b* of the base plate 30. The light emitting module 32 includes a light guide member 44, a top reflection sheet 45, a bottom reflection sheet 46, and the light source 48.

The light guide member 44 can be made of, for example, a sheet made of a translucent resin such as PET, polycarbonate, or acrylic. The light guide member 44 guides light emitted from the light source 48. The light guide member 44 and the reflection sheets 45 and 46 extend to positions that overlap below all the key switches 24. In the light guide member 44, the light diffusion pattern 42 is provided on a surface of a part located below each keycap 24*a*. The light diffusion pattern 42 can be provided on a bottom surface 44*a* of the light guide member 44 at a position directly below the through-hole 30*c*. The light diffusion pattern 42 can be provided on a top surface of the light guide member 44 or can be provided on both the top and bottom surfaces of the light guide member 44.

The top reflection sheet 45 is laminated on the top surface of the light guide member 44. The bottom reflection sheet 46 is laminated on the bottom surface of the light guide member 44. The reflection sheets 45 and 46 cover the surface of the light guide member 44 to suppress light leakage in the light guide member 44, and maintain the amount of light inside the light guide member 44 by applying white paint on the surface in contact with the light guide member 44. The reflection sheets 45 and 46 can be made of, for example, sheets made of a resin such as PET, polyester, or polyolefin having high reflection performance. The top reflection sheet 45 is cut out at a position that vertically overlaps the through-hole 30*c*. Accordingly, the light guide member 44 allows the light diffused by the light diffusion pattern 42 to pass through the through-holes 30*c* and 38, thereby enabling the keycap 24*a* to emit light.

The light source 48 can be composed of, for example, a light emitting diode (LED). The light source 48 is attached, for example, substantially at the center of the light guide member 44 in the left-right direction, and a plurality of light sources 48 is arranged in parallel in the front-rear direction (refer to FIG. 4). The light source 48 is mounted on a top surface of a flexible printed circuit (FPC) 50. The flexible printed circuit 50 is disposed along the bottom surface of the bottom reflection sheet 46, and one end thereof is electrically connected to the motherboard.

In one or more embodiments, the light emitting module 32 has a hole portion 52 that penetrates the bottom reflection sheet 46 and the light guide member 44 and that has an inner surface that is closed by the top reflection sheet 45. The light source 48 is inserted into the hole portion 52 and can emit light in a lateral direction from light emission surfaces 48*a* provided on the left and right side surfaces. The light emitted from the light source 48 is guided in the left-right direction by the light guide member 44, and can be emitted to each keycap 24*a* from the back surface.

Reference numeral 54 in FIG. 4 denotes a mounting hole that is formed by penetrating through an appropriate portion of the keyboard device 12A. A screw for fixing the keyboard device 12A to the frame 26 is inserted into the mounting hole 54.

As described above, the keyboard device 12A includes the light source 48, the plurality of keycaps 24*a* that is capable of emitting light with the light emitted from the light source 48, the base plate 30 that supports the keycap 24*a* on the top surface 30*a* side, and the membrane sheet 31 that is laminated on the top surface 30*a* of the base plate 30. In the keyboard device 12A, the contact sheets 33 and 34 and the spacer sheet 35 constituting the membrane sheet 31 have light transmittance, and the light reflecting layer 36 is provided on the top surface 33*a* of the top contact sheet 33. The membrane sheet 31 has a part (extending portion 40) of at least one sheet (for example, the top contact sheet 33) of the contact sheets 33 and 34 and the spacer sheet 35 that is disposed below the keycap 24*a*, and has the light diffusion pattern 42 on a surface of the extending portion 40.

In such a keyboard device 12A, as illustrated in FIG. 2, a part of the light L emitted from the light source 48 to the keycap 24*a* is incident into the membrane sheet 31 from the end surface exposed to the through-hole 38. Here, in the keyboard device 12A, the top surface 33*a* of the top contact sheet 33 located on the uppermost layer of the three-layer sheet constituting the membrane sheet 31 is covered with the light reflecting layer 36. Therefore, the light L introduced into the membrane sheet 31 is efficiently guided while being reflected and diffused within the membrane sheet 31 having light transmittance. The light L is diffused and reflected by the light diffusion pattern 42 provided on the extending portion 40, and causes the keycap 24*a* to emit light. As a result, the keyboard device 12A suppresses the occurrence of light leakage of the light L introduced into the membrane sheet 31 and a decrease in the amount of light, thereby enabling each keycap 24*a* to emit light with a sufficient amount of light. A white arrow L in FIG. 2 mainly indicates the light guided in the light guide member 44 and the membrane sheet 31, and a one-dot chain line arrow L mainly indicates the light diffused by the light diffusion pattern 42, and the same applies to each of the subsequent drawings from FIG. 5.

In particular, since the top surface of the membrane sheet is exposed on the exterior of the keyboard device, the top surface of the membrane sheet has been covered with black paint (the decorative layer 37) in the related art. Therefore, in a case where light is incident on the membrane sheet in the related art, the light is absorbed by the black paint and is dimmed, which causes a problem that the amount of light emitted from the keycap 24*a* is easily decreased. In this regard, in the keyboard device 12A, since the light reflecting layer 36 is provided below the decorative layer 37, light reduction due to absorption in the decorative layer 37 can be avoided, and efficient light guide within the membrane sheet 31 can be performed.

The keyboard device 12A can include the light guide member 44 laminated on the bottom surface 30*b* side of the base plate 30. The membrane sheet 31 has the through-hole 38 through which the light L guided by the light guide member 44 passes to the keycap 24*a*, below the keycap 24*a*. In the keyboard device 12A, most of the light L from the light source 48 is emitted from the light diffusion pattern 42 that is provided in the light guide member 44 to the keycap 24*a*. On the other hand, a part of the light L diffused from the light guide member 44 is introduced into the membrane sheet 31. However, the keyboard device 12A not only suppresses the light leakage in the membrane sheet 31 as described above, but also allows the light to be emitted from the light diffusion pattern 42 provided in the extending portion 40 to the keycap 24*a*.

That is, the keyboard device 12A can suppress a decrease in the amount of light just by adding the light reflecting layer 36 and the extending portion 40 to the keyboard device including the general light guide member 44. Therefore, the keyboard device 12A can be easily applied to a backlight type keyboard device widely used in the related art, can effectively utilize light that enters the membrane sheet 31, and thus has high versatility.

Next, a keyboard device 12B will be described.

Figure 5:
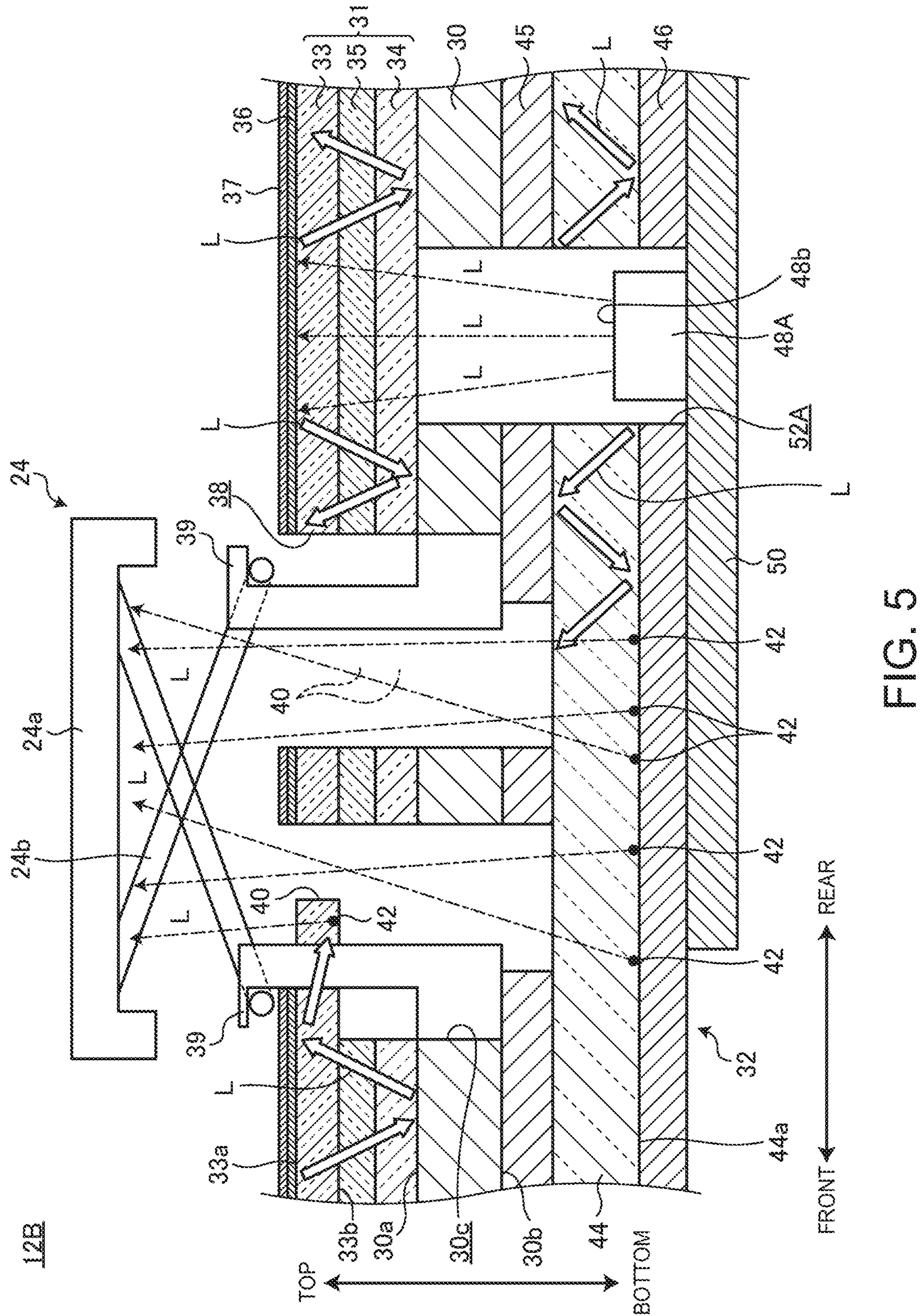
FIG. 5 is a schematic side cross-sectional view of a keycap and a peripheral portion thereof in a keyboard device according to one or more embodiments.

FIG. 5 is a schematic side cross-sectional view of a keycap 24*a* and a peripheral portion thereof in the keyboard device 12B. In the keyboard device 12B, elements having the same or similar functions and effects as those of the keyboard device 12A described above are denoted by the same reference numerals and the detailed descriptions are omitted, and the same applies to a keyboard device 12C.

The keyboard device 12B illustrated in FIG. 5 is different from the keyboard device 12A illustrated in FIG. 2 in that a part of the plurality of light sources 48 is replaced with a light source 48A. As illustrated in FIG. 4, in the keyboard device 12A, six light sources 48 are arranged in parallel in the front-rear direction, for example. The light source 48A of the keyboard device 12B is disposed, for example, at a position indicated by the reference numeral "48" indicating the light source in FIG. 4 with the reference numeral "48A" added in parentheses. The light source 48A can be obtained by replacing, for example, two of the six light sources 48 with the light source 48A. The number ratio of the light sources 48 and 48A may be different from above. The number ratio of the light sources 48 and 48A can be appropriately set, for example, in order to control the light guide amount in the light guide member 44 and the light guide amount in the membrane sheet 31 at a predetermined ratio.

The light source 48A is composed of, for example, an LED and is mounted on the top surface of the flexible printed circuit 50, which is the same as the other light sources 48. The light source 48A has a different light emission direction (the direction of the light emission surface) compared to the light source 48. The light source 48A has a light emission surface 48*b* on a top surface thereof and can emit light upward.

As illustrated in FIG. 5, the keyboard device 12A has a hole portion 52A at a position corresponding to the light source 48A. The hole portion 52A is a hole deeper than the hole portion 52. The light source 48A is inserted into the hole portion 52A. The hole portion 52A penetrates the bottom reflection sheet 46, the light guide member 44, the top reflection sheet 45, and the base plate 30, and the inner surface is closed by the membrane sheet 31. In the light source 48A inserted into the hole portion 52A, the upward light emission surface 48*b* faces the bottom surface of the membrane sheet 31. Therefore, the light emitted from the light source 48A is incident more on the membrane sheet 31 than on the light guide member 44.

Therefore, in the keyboard device 12B, the light L emitted upward from the light source 48A is incident on the bottom surface of the membrane sheet 31. In the keyboard device 12B, the top surface 33*a* of the top contact sheet 33 located on the uppermost layer of the membrane sheet 31 is also covered with the light reflecting layer 36. Therefore, the light L introduced into the membrane sheet 31 from the light source 48A is efficiently guided while being reflected and diffused within the membrane sheet 31 having light transmittance. The light L is diffused and reflected by the light diffusion pattern 42 provided on the extending portion 40, and causes the keycap 24*a* to emit light. On the other hand, the light L that is emitted from another light source 48 and is guided by the light guide member 44 is emitted from the light diffusion pattern 42 provided on the light guide member 44 to the keycap 24*a*.

As a result, the keyboard device 12B also suppresses the occurrence of light leakage of the light L introduced into the membrane sheet 31 and a decrease in the amount of light, thereby enabling each keycap 24*a* to emit light with a sufficient amount of light. In the keyboard device 12B, the light amount ratio of the light introduced into the membrane sheet 31 and the light introduced into the light guide member 44 can be adjusted by appropriately adjusting the number ratio of the light source 48A to the light source 48. For example, in a case where the keycap 24*a* is viewed as a whole, it is possible to adjust the amount of light passing through the membrane sheet 31 to 60% and adjust the amount of light passing through the light guide member 44 to 40%. Therefore, the keyboard device 12B can be designed such that, for example, the light guide member 44 is made as thin as possible and the resulting insufficient amount of light is compensated by the membrane sheet 31. Accordingly, the keyboard device 12B has an advantage that the overall thickness can be reduced. In addition, in a case where the thickness of the light guide member 44 is not changed, the keyboard device 12B can also reduce power consumption by reducing the number or current value of the light sources 48 and 48A.

Next, the keyboard device 12C.

Figure 6:
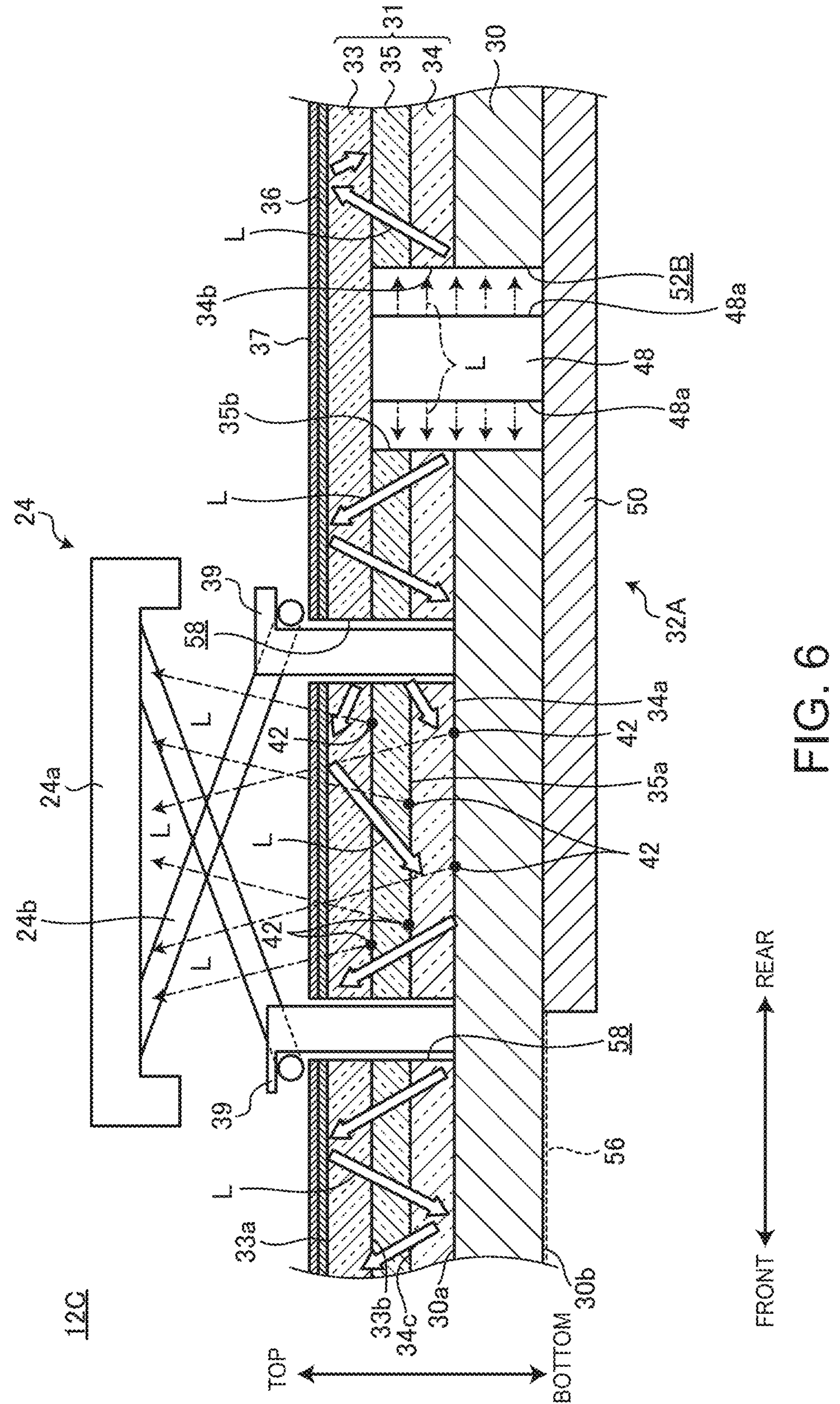
FIG. 6 is a schematic side cross-sectional view of a keycap and a peripheral portion thereof in a keyboard device according to one or more embodiments.

FIG. 6 is a schematic side cross-sectional view of the keycap 24*a* and a peripheral portion thereof in the keyboard device 12C. FIG. 7 is a schematic plan view of the keycaps 24*a* and the peripheral portion thereof illustrated in FIG. 6. In FIG. 7, the rubber dome 24*c* is not illustrated.

The keyboard device 12C illustrated in FIG. 6 is different from the keyboard devices 12A and 12B described above in that the keyboard device 12C includes a light emitting module 32A having a configuration different from the light emitting module 32 and a hole portion 52B having a configuration different from the hole portions 52 and 52A. In addition, the keyboard device 12C is also different from the configuration described above in that the membrane sheet 31 does not substantially have the through-hole 38.

The light emitting module 32A is different from the light emitting module 32 described above in that the light guide member 44, the top reflection sheet 45, and bottom reflection sheet 46 are not provided. The light emitting module 32A can be configured to substantially include only the light source 48 and the flexible printed circuit 50 on which the light source 48 is mounted. The flexible printed circuit 50 of the light emitting module 32A is directly laminated on the bottom surface 30*b* of the base plate 30. Such a keyboard device 12C has a configuration in which the light emitted from the light source 48 is guided to each keycap 24*a* only by the membrane sheet 31 instead of the light guide member 44.

The flexible printed circuit 50 covers only a part of the bottom surface 30*b* of the base plate 30. Therefore, in the keyboard device 12C, it is preferable that at least a part of the bottom surface 30*b* of the base plate 30, which is not covered with the flexible printed circuit 50, is covered with a sheet 56. It is used to cover a punched hole or the like formed in the base plate 30. The sheet 56 can be formed of a sheet having the same light reflectivity as the reflection sheets 45 and 46 described above.

The hole portion 52B is open to the bottom surface of the membrane sheet 31 (a bottom surface 34*a* of the bottom contact sheet 34) and penetrates the base plate 30. The hole portion 52B can penetrate the base plate 30, the bottom contact sheet 34, and the spacer sheet 35, and the inner surface can be closed by the top contact sheet 33. The light source 48 is inserted into the hole portion 52B. It is preferable that the light source 48 is installed at a height position where at least the left and right light emission surfaces 48*b* face the end surfaces 34*b* and 35*b* of the bottom contact sheet 34 and the spacer sheet 35 which form an inner wall surface of the hole portion 52B. As a result, the light L emitted from the light emission surface 48*b* of the light source 48 in the lateral direction is smoothly incident into the membrane sheet 31 from the end surfaces 34*b* and 35*b*.

As described above, the keyboard device 12C does not substantially have the through-hole 38 in the membrane sheet 31. As illustrated in FIGS. 6 and 7, in the keyboard device 12C, the membrane sheet 31 is laid out below each keycap 24*a*. In this way, the membrane sheet 31 includes the light diffusion pattern 42 in a part disposed below the keycap 24*a*.

The light diffusion pattern 42 can be provided on at least one surface of the contact sheets 33 and 34 and the spacer sheet 35 located below the keycap 24*a*. In a case where the light diffusion patterns 42 are provided only on a part of the sheet of the contact sheets 33 and 34 and the spacer sheet 35, only the sheet on which the light diffusion pattern 42 is provided can be disposed below the keycap 24*a*. In the configuration example illustrated in FIG. 6, the light diffusion pattern 42 is provided on each of the surfaces (bottom surfaces 33*b* and 34*a*) of the contact sheets 33 and 34 disposed below the keycap 24*a* and the surface (bottom surface 35*a*) of the spacer sheet 35. The light diffusion pattern 42 can be provided on the top surfaces of the contact sheets 33 and 34 and the spacer sheet 35, or can be provided on both the top and bottom surfaces of each of the contact sheets 33 and 34 and the spacer sheet 35. Thus, the keyboard device 12C can more sufficiently secure the amount of light diffused from the membrane sheet 31 to the keycap 24*a*.

In addition, also in the keyboard device 12C, a hook 49 needs to penetrate the membrane sheet 31. Therefore, the keyboard device 12C forms a small hole portion 58 for inserting the hook 49 in the membrane sheet 31 (refer to FIGS. 6 and 7). However, the hole portion 58 may hinder the guiding and diffusing of the light in the membrane sheet 31. Therefore, it is preferable that the hole portion 58 is formed to have a minimum size surrounding the periphery of each hook 49. It is preferable that a gap between an inner peripheral surface of the hole portion 58 and the hook 49 is set to, for example, 0.3 mm or less.

Accordingly, the keyboard device 12C includes the light source 48, the plurality of keycaps 24*a* that is capable of emitting light with the light emitted from the light source 48, the base plate 30 that supports the keycap 24*a* on the top surface 30*a* side, and the membrane sheet 31 that is laminated on the top surface 30*a* of the base plate 30. In the keyboard device 12C, the contact sheets 33 and 34 and the spacer sheet 35 constituting the membrane sheet 31 have light transmittance, and the light reflecting layer 36 is provided on the top surface 33*a* of the top contact sheet 33. The membrane sheet 31 has at least one sheet of the contact sheets 33 and 34 and the spacer sheet 35 disposed below the keycap 24*a*, and has the light diffusion pattern 42 on a surface of the sheet.

In such a keyboard device 12C, as illustrated in FIG. 6, the light L from the light source 48 is guided by the membrane sheet 31 and is emitted to the keycap 24*a*. In the keyboard device 12C, the top surface 33*a* of the top contact sheet 33 located on the uppermost layer of the membrane sheet 31 is also covered with the light reflecting layer 36. Therefore, the light L introduced into the membrane sheet 31 is efficiently guided while being reflected and diffused within the membrane sheet 31 having light transmittance. The light L is diffused and reflected by the light diffusion pattern 42 provided on the membrane sheet 31 disposed below each keycap 24*a*, and causes the keycap 24*a* to emit light. As a result, the keyboard device 12C suppresses the occurrence of light leakage of the light L introduced into the membrane sheet 31 and a decrease in the amount of light, thereby enabling each keycap 24*a* to emit light with a sufficient amount of light.

In particular, in the keyboard device 12C, the light emitting module 32A does not have the light guide member 44, and the reflection sheets 45 and 46. The light L is guided from the light source 48 to the keycap 24*a* only passing through the membrane sheet 31. That is, the keyboard device 12C uses the membrane sheet 31 as the light guide member, and thus the light guide member 44 and the reflection sheets 45 and 46 are not required to be installed. Therefore, the keyboard device 12C can significantly reduce the thickness compared to the keyboard devices 12A and 12B described above. Furthermore, the number of components of the keyboard device 12C can be reduced by the amount of the light guide member 44 and the like, and the product cost can also be reduced.

The keyboard device 10C can include a hole portion 52B that is open to the bottom surface 34*a* of the membrane sheet 31 and penetrates the base plate 30. The light source 48 is inserted into the hole portion 52B. A lateral light emission surface 48*a* of the light source 48 faces an inner wall surface of the hole portion 52B formed in the membrane sheet 31. Therefore, the keyboard device 10C can reliably secure an incident surface of the light L from the light source 48 with respect to the membrane sheet 31 that acts as the light guide member.

The hole portion 52B can penetrate the base plate 30, the bottom contact sheet 34, and the spacer sheet 35, and the inner surface can be closed by the top contact sheet 33. In addition, the light emission surface 48*a* can face the end surfaces 34*b* and 35*b* of the bottom contact sheet 34 and the spacer sheet 35 which form the inner wall surface of the hole portion 52B. Accordingly, in the membrane sheet 31, it is possible to avoid that the light source 48 is exposed above the keyboard device 12C and the appearance is impaired while sufficiently securing the incident surface of the light L from the light source 48.

In the membrane sheet 31, the top contact sheet 33, the bottom contact sheet 34, and the spacer sheet 35 are disposed below the keycap 24*a*, and the light diffusion pattern 42 can be provided on each surface of each of these sheets 33 to 35. In this case, the amount of light L that is diffused from the membrane sheet 31 to each keycap 24*a* can be sufficiently secured. In particular, the membrane sheet 31 has a three-layer structure. Therefore, in a case where the light diffusion pattern 42 is provided only on the surface of the lowermost layer of the bottom contact sheet 34, it is difficult to deliver the light L passing through the spacer sheet 35 and the top contact sheet 33 on the light diffusion pattern 42 to the keycap 24*a*. In this regard, the amount of light L delivered to each keycap 24*a* can be increased by providing the light diffusion pattern 42 on all three layers.

As illustrated in FIG. 7, the installation density of the light diffusion pattern 42 provided on the membrane sheet 31 disposed below the keycap 24*a* can be changed according to a distance from the light source 48 to each keycap 24*a*. For example, in a configuration example illustrated in FIG. 7, seven light diffusion patterns 42 are disposed below the keycap 24*a* located to the left of the light source 48, and ten light diffusion patterns 42 are disposed below the keycap 24*a* located further to the left of the keycap 24*a*. As described above, the membrane sheet 31 can increase the installation density of the light diffusion pattern 42 below the keycap 24*a* which is farther from the light source 48 compared to the installation density of the light diffusion pattern 42 below the keycap 24*a* which is closer to the light source 48. In this case, the keycap 24*a* located at a position far from the light source 48 can also emit light with a sufficient amount of light.

Incidentally, in the keyboard device 12C, for example, the height of the light source 48 can be set to 0.4 mm, the thickness of the base plate 30 can be set to 0.2 mm, the thickness of each of the contact sheets 33 and 34 can be set to 0.07 mm, and the thickness of the spacer sheet 35 can be set to 0.06 mm. The thickness of the flexible printed circuit 50 is, for example, 0.1 mm. In this case, in the keyboard device 12C, a depth of the hole portion 52B is 0.33 mm, and the entire height of the light source 48 cannot be inserted into the hole portion 52B. Therefore, in the keyboard device 12C, in order to eliminate the difference (0.07 mm) between the height of the light source 48 and the depth of the hole portion 52B, for example, the thickness of the bottom contact sheet 34 can also be increased from 0.07 mm to 0.17 mm. In this case, the light source 48 can be reliably inserted into the hole portion 52B, and further, the incident surface of the light L with respect to the membrane sheet 31 can be secured. That is, in the keyboard device 12C, the thickness of the bottom contact sheet 34 can be made larger than the thickness of the top contact sheet 33.

As another method of eliminating the difference (0.07 mm) above described, it is conceivable to change the thickness of the top contact sheet 33 or the spacer sheet 35. However, in a case where the top contact sheet 33 is forcibly thickened, flexibility is hindered, and a smooth switching operation of the membrane sheet 31 may be hindered. In a case where the thickness of the spacer sheet 35 is increased, the stroke required for switching of the contact sheets 33 and 34 is increased. Therefore, it is preferable to increase the thickness of the bottom contact sheet 34 as described above.

As described above, the keyboard device 12C can guide the light from the light source 48 to each keycap 24*a* only by using the membrane sheet 31 instead of the light guide member 44 and the reflection sheets 45 and 46. Here, the membrane sheet 31 has a conductive pattern on the bottom surface 33*b* of the top contact sheet 33 and the top surface 34*c* of the bottom contact sheet 34. In addition, the spacer sheet 35 has hole portions for bringing the contact sheets 33 and 34 into contact at various positions. Therefore, although all three layers of the membrane sheet 31 have light transmittance, the amount of light may be decreased compared to a general light guide plate (light guide member 44).

The configuration in which the light diffusion pattern 42 is provided on each surface of the top contact sheet 33, the bottom contact sheet 34, and the spacer sheet 35 located below the keycap 24*a* described above is a configuration for further increasing the amount of light in the keyboard device 12C. The configuration described above in which the installation density of the light diffusion pattern 42 provided on the membrane sheet 31 is changed according to the distance from the light source 48 is the same. In the following, another configuration example in which the amount of light of the keyboard device 12C can be further increased will be described with reference to FIGS. 8 and 9 in order.

Figure 8:
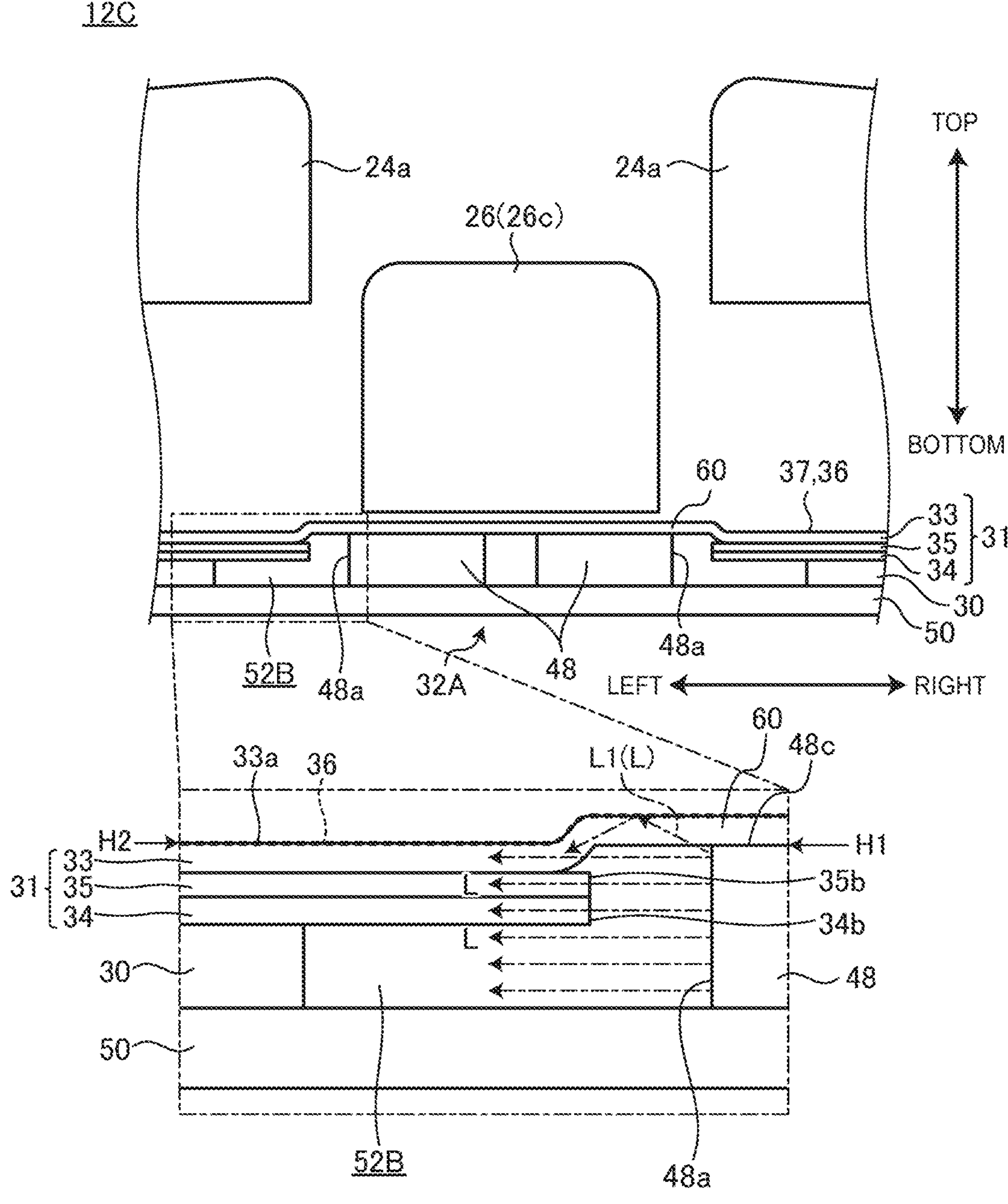
FIG. 8 is a schematic side cross-sectional view of a light source and a peripheral portion thereof in a keyboard device including a membrane sheet having a bulging portion, in accordance with one or more embodiments.

FIG. 8 is a schematic side cross-sectional view of the light source 48 and a peripheral portion thereof in the keyboard device 12C including the membrane sheet 31 having a bulging portion 60. In FIG. 8, in order to secure the visibility of the drawing, the illustration of the cross-sectional hatching of each component and the illustration of the light reflecting layer 36 and the decorative layer 37 are appropriately omitted, and the same applies to FIG. 9.

The keyboard device 12C illustrated in FIG. 8 has the bulging portion 60 in a part of the membrane sheet 31. The bulging portion 60 is formed by bulging a part of the top contact sheet 33 that forms the inner surface of the hole portion 52B upward. The height of the upward bulge of the bulging portion 60 can be set to be, for example, equal to or higher than the thickness of the top contact sheet 33. In this case, in a case where a vertical direction of the keyboard device 12C is used as a reference, the top surface 48*c* of the light source 48 can be set at a height position equal to or higher than the top surface 33*a* of the top contact sheet 33 excluding the bulging portion 60. Specifically, as illustrated in FIG. 8, a height H1 of the top surface 48*c* of the light source 48 can be set to be equal to or higher than a height H2 of the top surface 33*a* of the top contact sheet 33. In FIG. 8, the height H1 and the height H2 are substantially the same height, but the height H1 can also be set to a position higher than the height H2.

Therefore, the keyboard device 12C includes the bulging portion 60, and thus the light emission surface 48*a* of the light source 48 can be set to a height position facing the top contact sheet 33. For this reason, as illustrated in FIG. 8, in the keyboard device 12C, the light L from the light source 48 is smoothly incident on the top contact sheet 33 via the bulging portion 60 (refer to light L1 in FIG. 8). Therefore, the keyboard device 12C including the bulging portion 60 can further increase the amount of light L that linearly travels on the top contact sheet 33 and can further increase the amount of light on each keycap 24*a*. In addition, by providing the bulging portion 60, the keyboard device 12C can also eliminate the difference between the height of the light source 48 and the depth of the hole portion 52B described above without increasing the thickness of the bottom contact sheet 34 more than the thickness of the top contact sheet 33, for example.

Figure 9:
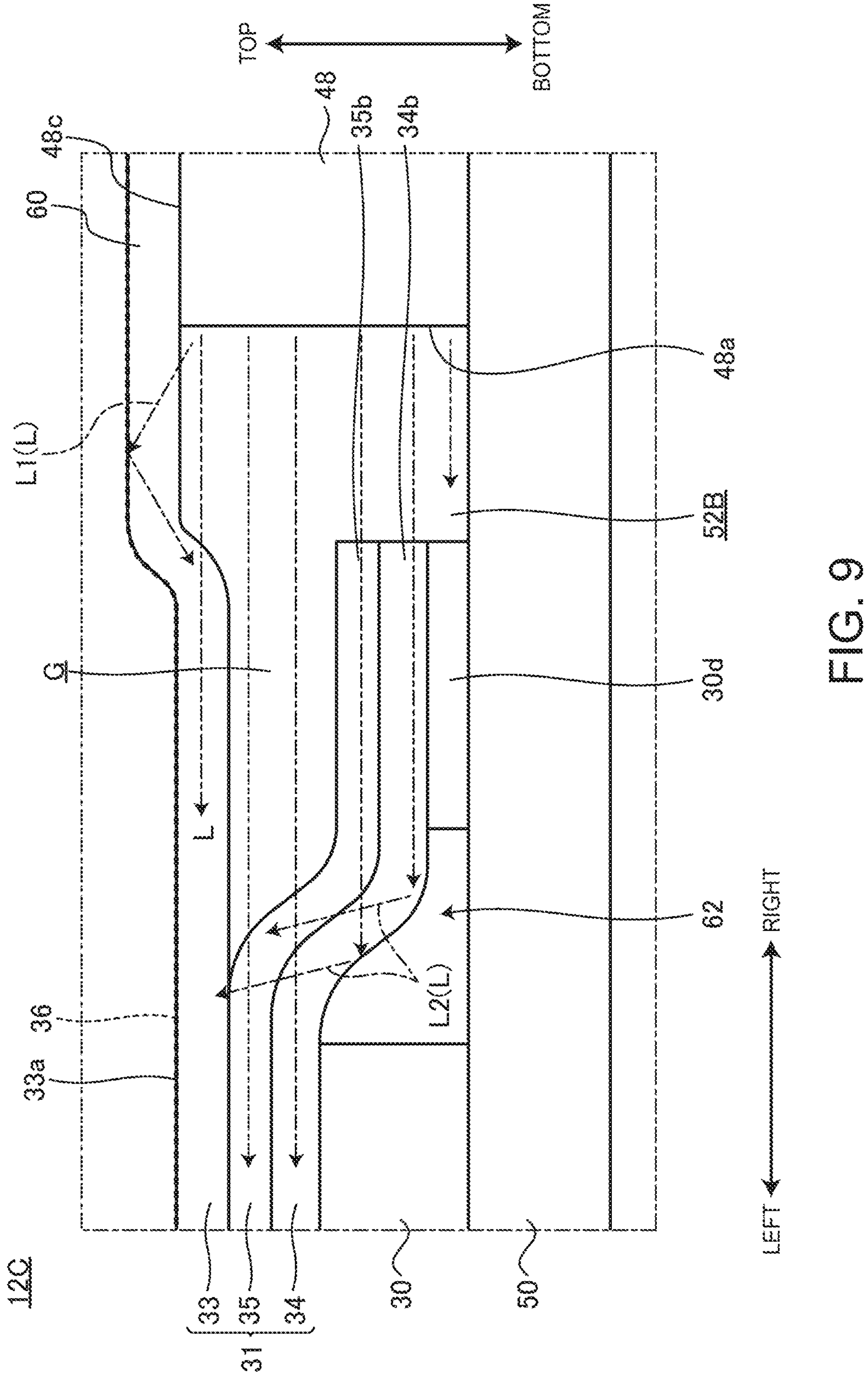
FIG. 9 is a schematic side cross-sectional view of a light source and a peripheral portion thereof in a keyboard device including a membrane sheet having a bent portion, in accordance with one or more embodiments.

FIG. 9 is a schematic side cross-sectional view of the light source 48 and a peripheral portion thereof in the keyboard device 12C including the membrane sheet 31 having a bent portion 62.

The keyboard device 12C illustrated in FIG. 9 has the bent portion 62 in a part of the membrane sheet 31. The bent portion 62 can be configured by bending a part of the spacer sheet 35 and the bottom contact sheet 34 forming the inner wall surface of the hole portion 52B downward. The bent portion 62 is formed by bending the end surfaces 34*b* and 35*b* of the bottom contact sheet 34 and the spacer sheet 35 downward in a crank shape in a range of a predetermined distance. Reference numeral 30*d* in FIG. 9 denotes a double-sided tape for fixing and stabilizing the end portion of the bent portion 62 to the base plate 30. The membrane sheet 31 has the bent portion 62, and thus, a gap G can be formed between the top contact sheet 33 and the spacer sheet 35 and the bottom contact sheet 34 bent at the bent portion 62. Accordingly, the light emission surface 48*a* can face the bent portion 62 and the gap G.

Therefore, the keyboard device 12C includes the bent portion 62, so that the light L from the light source 48 is incident on the bottom contact sheet 34 and the spacer sheet 35 from the end surfaces 34*b* and 35*b* of the bent portion 62. Further, the light L passes through the gap G, is incident on the bottom contact sheet 34 and the spacer sheet 35 from the inclined surface of the bent portion 62, and is reflected from the surface of the bent portion 62 (refer to light L2 in FIG. 9). The keyboard device 12C including the bent portion 62 can further increase the amount of light L passing through the bottom contact sheet 34 and the spacer sheet 35 and can further increase the amount of light L on each keycap 24*a*. In FIG. 9, the bent portion 62 is used in conjunction with the bulging portion 60, but the bent portion 62 can also be applied to a configuration in which the bulging portion 60 is not provided.

The present invention is not limited to the above-described embodiments, and modification is freely possible without departing from the gist of the present invention.

DESCRIPTION OF SYMBOLS

- 10 electronic apparatus
- 12, 12A to 12C keyboard device
- 14 chassis
- 24*a* keycap
- 30 base plate
- 30*c*, 38 through-hole
- 31 membrane sheet
- 32, 32A light emitting module
- 33 top contact sheet
- 34 bottom contact sheet
- 35 spacer sheet
- 36 light reflecting layer
- 40 extending portion
- 42 light diffusion pattern
- 44 light guide member
- 48, 48A light source
- 48*a*, 48*b* light emission surface
- 50 flexible printed circuit
- 52, 52A, 52B hole portion
- 60 bulging portion
- 62 bent portion

What is claimed is:

1. A keyboard device comprising:

a light source and a plurality of keycaps that is capable of emitting light emitted from the light source;

a base plate configured to support the keycaps on a top surface side; and a membrane sheet that has a top contact sheet, a bottom contact sheet, and a spacer sheet interposed between the top contact sheet and the bottom contact sheet, and that is laminated on a top surface of the base plate, wherein the top contact sheet, the bottom contact sheet, and the spacer sheet have light transmittance, a light reflecting layer is provided on a top surface of the top contact sheet, and the membrane sheet has a part of at least one sheet of the top contact sheet, the bottom contact sheet, and the spacer sheet disposed below the keycaps, and a light diffusion pattern on a surface of the part disposed below the keycaps.

2. The keyboard device according to claim 1, further comprising:

a hole portion configured to open to a bottom surface of the membrane sheet and penetrate the base plate, wherein the light source is inserted into the hole portion, and the light source has a lateral light emission surface facing an inner wall surface of the hole portion formed on the membrane sheet.

3. The keyboard device according to claim 2, wherein the hole portion penetrates the base plate, the bottom contact sheet, and the spacer sheet, and an inner side of the hole portion is closed by the top contact sheet.

4. The keyboard device according to claim 3, wherein the light emission surface faces end surfaces of the bottom contact sheet and the spacer sheet forming the inner wall surface of the hole portion.

5. The keyboard device according to claim 3, wherein a thickness of the bottom contact sheet is greater than a thickness of the top contact sheet.

6. The keyboard device according to claim 3, wherein the top contact sheet has a bulging portion in which a part forming an inner surface of the hole portion bulges upward, a top portion of the light source is inserted into the bulging portion, and in a case where a vertical direction of the keyboard device is used as a reference, a top surface of the light source is located at a height position equal to or higher than the top surface of the top contact sheet excluding the bulging portion.

7. The keyboard device according to claim 3, wherein the membrane sheet has a bent portion that is formed by bending a part of the spacer sheet and the bottom contact sheet forming the inner wall surface of the hole portion downward to form a gap between the spacer sheet and the top contact sheet, and the light emission surface of the light source faces the bent portion.

8. The keyboard device according to claim 2, further comprising:

a flexible printed circuit on which the light source is mounted, wherein the flexible printed circuit is laminated on a bottom surface of the base plate.

9. The keyboard device according to claim 2, wherein in the membrane sheet, the top contact sheet, the bottom contact sheet, and the spacer sheet are disposed below the keycaps, and light diffusion patterns are provided on surfaces of the top contact sheet, the bottom contact sheet, and the spacer sheet disposed below the keycaps, respectively.

10. The keyboard device according to claim 1, further comprising:

a light guide member that is laminated on a bottom surface side of the base plate, wherein the membrane sheet has a through-hole below the keycaps for passing through light guided by the light guide member to the keycaps, and the membrane sheet has an extending portion in which at least one sheet of the top contact sheet, the bottom contact sheet, and the spacer sheet extends inside the through-hole and the light diffusion pattern is provided on the extending portion.

11. The keyboard device according to claim 10, further comprising:

a hole portion that is configured to penetrate the light guide member and the base plate and that has an inner surface formed of the membrane sheet, wherein the light source is inserted into the hole portion.

12. The keyboard device according to claim 11, wherein a plurality of the light sources is provided, and a part of the plurality of light sources is inserted into the hole portion and has an upward light emission surface facing the inner surface of the hole portion.

13. An electronic apparatus comprising:

a chassis; and a keyboard device including a light source and a plurality of keycaps that is capable of emitting light with light emitted from the light source and facing a top surface of the chassis, wherein the keyboard device includes a base plate configured to support the keycaps on a top surface side, and a membrane sheet that has a top contact sheet, a bottom contact sheet, and a spacer sheet interposed between the top contact sheet and the bottom contact sheet, and that is laminated on a top surface of the base plate, the top contact sheet, the bottom contact sheet, and the spacer sheet have light transmittance, a light reflecting layer is provided on a top surface of the top contact sheet, and the membrane sheet has a part of at least one sheet of the top contact sheet, the bottom contact sheet, and the spacer sheet disposed below the keycaps, and a light diffusion pattern on a surface of the part disposed below the keycaps.

14. The electronic apparatus according to claim 13, wherein the keyboard device includes a hole portion configured to open to a bottom surface of the membrane sheet and penetrate the base plate, the light source is inserted into the hole portion, and the light source has a lateral light emission surface facing an inner wall surface of the hole portion formed on the membrane sheet.

15. The electronic apparatus according to claim 14, wherein in the membrane sheet, the top contact sheet, the bottom contact sheet, and the spacer sheet are disposed below the keycaps, and the light diffusion patterns are provided on surfaces of the top contact sheet, the bottom contact sheet, and the spacer sheet disposed below the keycaps, respectively.

16. The electronic apparatus according to claim 13, wherein a light guide member that is laminated on a bottom surface side of the base plate is provided, the membrane sheet has a through-hole below the keycaps for passing through light guided by the light guide member to the keycaps, and the membrane sheet has an extending portion in which at least one sheet of the top contact sheet, the bottom contact sheet, and the spacer sheet extends inside the through-hole and the light diffusion pattern is provided on the extending portion.

17. The electronic apparatus according to claim 16, wherein a hole portion that is configured to penetrate the light guide member and the base plate and that has an inner surface formed of the membrane sheet is provided, and the light source is inserted into the hole portion.

* * * * *